(12) United States Patent
Wang et al.

(10) Patent No.: US 9,436,518 B2
(45) Date of Patent: Sep. 6, 2016

(54) MAINTENANCE METHOD OF INTELLIGENT ODN MANAGEMENT SYSTEM

(71) Applicant: FIBERHOME TELECOMMUNICATION TECHNOLOGIES CO., LTD., Hubei (CN)

(72) Inventors: Xin Wang, Hubei (CN); Yun Rong, Hubei (CN); Ling Li, Hubei (CN); Haicheng Chen, Hubei (CN)

(73) Assignee: FIBERHOME TELECOMMUNICATION TECHNOLOGIES CO., LTD., Wuhan, Hubei (CN)

( * ) Notice: Subject to any disclaimer, the term of this patent is extended or adjusted under 35 U.S.C. 154(b) by 13 days.

(21) Appl. No.: 14/406,697

(22) PCT Filed: Jul. 24, 2013

(86) PCT No.: PCT/CN2013/079974
§ 371 (c)(1),
(2) Date: Dec. 9, 2014

(87) PCT Pub. No.: WO2014/177485
PCT Pub. Date: Aug. 7, 2014

(65) Prior Publication Data
US 2015/0160985 A1 Jun. 11, 2015

(30) Foreign Application Priority Data

Jan. 30, 2013 (CN) .......................... 2013 1 0034930

(51) Int. Cl.
*G06F 9/46* (2006.01)
*G06F 9/52* (2006.01)
*H04Q 11/00* (2006.01)

(52) U.S. Cl.
CPC ............. *G06F 9/52* (2013.01); *H04Q 11/0067* (2013.01); *H04Q 2011/0081* (2013.01); *H04Q 2213/1301* (2013.01)

(58) Field of Classification Search
CPC ........................................................ G06F 9/52
USPC ........................................................ 718/102
See application file for complete search history.

(56) References Cited

U.S. PATENT DOCUMENTS 5,619,698 A * 4/1997 Lillich ..................... G06F 8/65
712/E9.082

(Continued)

FOREIGN PATENT DOCUMENTS

| CN | 101141282 A | 3/2008 |
|----|-------------|--------|
| CN | 102571201 A | 7/2012 |
| CN | 103067797 A | 4/2013 |

*Primary Examiner* — Timothy A Mudrick
(74) *Attorney, Agent, or Firm* — Muncy, Geissler, Olds & Lowe, P.C.

(57) ABSTRACT

A maintenance method of intelligent ODN management system comprises the following steps: carrying out mutual exclusion protection on a same operation task, wherein each executable operation task is protected by operation authorization, and any one maintenance and management terminal needs to acquire the operation authorization of the operation task before executing the operation task and release the corresponding operation authorization after the execution is finished; and carrying out mutual exclusion protection on different maintenance and management terminals, wherein after a local maintenance center obtains control right on the intelligent ODN management system, a remote maintenance center and a local maintenance terminal need to apply for authorization from the local maintenance center before operating the intelligent ODN management system, and can deliver an operation instruction after successfully applying for the authorization. A system exception caused by conflicted operations is therefor effectively prevented.

8 Claims, 6 Drawing Sheets

(56) References Cited

U.S. PATENT DOCUMENTS

| | | | | |
|---|---|---|---|---|
| 2006/0265704 A1* | 11/2006 | Holt | G06F 15/16 | 717/169 |
| 2009/0003572 A1* | 1/2009 | Yu | H04L 12/66 | 379/201.12 |
| 2009/0030952 A1* | 1/2009 | Donahue | G06F 17/30566 | |
| 2009/0271793 A1* | 10/2009 | Rostedt | G06F 9/526 | 718/103 |
| 2010/0191884 A1* | 7/2010 | Holenstein | G06F 11/2094 | 710/200 |
| 2011/0093516 A1* | 4/2011 | Geng | G06F 8/65 | 707/827 |
| 2011/0110664 A1* | 5/2011 | Zhao | H04L 12/2416 | 398/67 |

\* cited by examiner

MAINTENANCE METHOD OF INTELLIGENT ODN MANAGEMENT SYSTEM

CROSS-REFERENCE TO RELATED APPLICATION

This application claims the benefit of PCT Patent Application No. PCT/CN2013/079974, filed on Jul. 24, 2013, in the State Intellectual Property Office of the People's Republic of China, the disclosure of which is incorporated herein in its entirety by reference.

BACKGROUND OF THE INVENTION

1. Field of the Intention

The present invention relates to the intelligent ODN management system, and in particular relates to a maintenance method of an intelligent ODN management system.

2. Description of the Related Art

ODN (Optical Distribution Network) is a FTTH (Fiber To The Home) optical cable network based on PON (Passive Optical Network) and is an important component of network. It is designed to provide optical transmission channel between OLT (Optical Line Terminal) and ONU (Optical Network Unit). The deployment and management of traditional ODN network optical fiber are realized by manual, and it is necessary to manually type in the corresponding relation of optical fiber connection to the background database, causing high error rate. In the process of maintenance, it is difficult to quickly position the trouble points, leading to low efficiency. With the construction of FTTx (Fiber-to-the-x) has entered the era of large-scale wiring and distribution, there are requirements for mass optical fiber distribution and high efficiency management in FTTx network, so that the carriers are faced with high deployment cost and great operation and maintenance pressure.

With the network structures tend to be increasingly complicated, the operating systems intended for maintenance and management of network devices are developing towards the direction of increasing complexity. To meet the requirements at different service levels, the existing intelligent ODN management systems and maintenance management systems are mainly divided into three parts, namely local maintenance terminal, local maintenance center and remote maintenance center, as shown in FIG. 1. The local operation maintenance terminal directly logs on the instruction line module of device through serial interface to perform operation, read configuration and deliver instruction. The local maintenance center can be notebook pc, special PDA or intelligent mobile telephone, which is designed to make monitoring and management on SODN system through USB host or USB slave interface. The remote maintenance center is interconnected by ODN network management with the user resource management system and worksheet system as well as FTTH network management. ODN network system is mainly used to management the connection relations of devices, route topology and line connection as well as wiring.

In terms of physical position, the local maintenance terminal and the local maintenance center are close to the maintained network devices. The remote maintenance center is installed in the network management center. Several kinds of maintenance systems are apart. Since the local maintenance terminal, the local maintenance center and the remote maintenance center provide the user with the entrances to make operation maintenance on the same network equipment. If multiple users respectively carry out operation maintenance on devices through different maintenance systems, while users do not understand the maintenance requirements of other persons, it is possible that configuration error may be caused or multiple users may simultaneously perform read-write operation on a same variable of system, leading to unpredictable system error.

SUMMARY OF THE INVENTION

It is the technical objective of the present invention to solve the problem that unpredictable system errors may be easily triggered when multiple maintenance systems in intelligent ODN management system are performing operations.

To realize said technical objective, the present invention provides a maintenance method of intelligent ODN management system, comprising the following steps:

carrying out mutual exclusion protection on a same operation task, wherein each executable operation task is protected by operation authorization, and any one maintenance and management terminal needs to acquire the operation authorization of the operation task before executing the operation task and release the corresponding operation authorization after the execution is finished; the maintenance and management terminal comprises a local maintenance center, a remote maintenance center and a local maintenance terminal; and carrying out mutual exclusion protection on different maintenance and management terminals, wherein after a local maintenance center obtains control right on the intelligent ODN management system, a remote maintenance center and a local maintenance terminal need to apply for authorization from the local maintenance center before operating the intelligent ODN management system, and can deliver an operation instruction after successfully applying for the authorization.

In the said method, if the remote maintenance center and the local maintenance terminal need to exclusive enjoy the control right on the intelligent ODN management systems, carrying out the operation of locking the configuration right; after the operation of locking configuration right is finished, the other maintenance managements cannot carry out any operation on ODN device, and can only deliver an operation instruction after the remote maintenance center and local maintenance terminal have unlocked the control right on the intelligent ODN management system.

In the said method, if the time used by the remote maintenance center and the local maintenance terminal for locking the control right on the intelligent ODN management system exceeds the preset time limit, carrying out automatic unlocking.

In the said method, the local maintenance center preempting the control right on the intelligent ODN management systems in the preemption mode, and restoring the configuration data to the remote maintenance center and the local maintenance terminal to obtain the configuration prior to the control right on the intelligent ODN management system.

In the said method, the processing flow of carrying out mutual exclusion protection on the same operation task is as follows:

Step S210: ODN device initialization, completing power-on and polling self-inspection;

Step S220: receiving the operation instructions from the local maintenance center, the remote maintenance center or local maintenance terminal;

Step S230: determining whether the target operand of operation instruction is in release state, if yes, proceeding to Step S240; if no, proceeding to step S270;

Step S240: locking the operand;

Step S250: executing the operation instruction;

Step S260: after completion of operation, releasing the lock of operand, and end;

Step S270, waiting for the operand is released;

Step S280, determining whether the time of waiting for obtaining authority is time-out, if yes, proceeding to Step S290; otherwise, proceeding to step S240;

Step S290: returning alarm of system busy and operation instruction execution error, end.

In the said method, the processing flow of local operation maintenance terminal delivering operation instruction is as follows:

Step S401, receiving the operation instruction;

Step S402, determining the source of operation instruction; if the operation instruction is issued from the local maintenance terminal, proceeding to the step S403; if not, proceeding to the processing flow of the remote operation center or local maintenance center;

Step S403: determining whether the ODN device is under control of local maintenance center; if yes, proceeding to the Step S404; otherwise, proceeding to step S407;

Step S404: filing application for obtaining the control right to the local maintenance center;

Step S405: determining whether the local operation maintenance terminal has obtained the control right, if yes, proceeding to the step S410; otherwise, proceeding to the step S406;

Step S406; waiting for local maintenance center to release the control right, proceeding to step S409;

Step S407: determining whether ODN device is in the authority locking state of remote maintenance center; if yes, proceeding to the step S408, otherwise, proceeding to the step S409;

Step S408: waiting for the remote maintenance center to release the locking authority, so that the OND device is in idle state;

Step S409: determining whether waiting is time out; if yes, returning unsuccessfull execution of operation instruction and ending this flow; otherwise, proceeding to step S410;

Step S410, saving the current configuration data;

Step S411, delivering the operation instruction, and carrying out the processing flow of mutual exclusion protection on the same configuration operation;

Step S412, determining the result of the processing flow of carrying out mutual exclusion protection on the same configuration operation; if the operation is time-out and the operation authorization is preempted by local maintenance center, releasing the operation authorization, recovering the previous configuration and ending this flow; otherwise, proceeding to the step S413;

Step 413, executing the operation instruction according to normal sequence, and this flow is completed.

In the said method, the processing flow of the remote maintenance center delivering operation instruction is as follows:

Step S501, receiving the operation instruction;

Step S502, determining the source of operation instruction; if the operation instruction is from the remote maintenance center, proceeding to step S503; otherwise, proceeding to the processing flow of local maintenance center or local operation maintenance terminal;

Step S503: determining whether the ODN device is under control of local maintenance center; if yes, proceeding to the Step S504; if not, proceeding to step S508;

Step S504: filing application for obtaining the control right to the local maintenance center;

Step S505: determining whether the remote maintenance center has obtained the control right; if yes, proceeding to the step S510; otherwise, proceeding to the step S506;

Step S506: waiting for the local maintenance center to release the control right, and ODN device is in idle state;

Step S507, whether waiting is time out; if yes, ending this flow; otherwise, proceeding to step S510;

Step S508: determining whether the ODN device is in the authorization locked state of local maintenance terminal; if yes, proceeding to the Step 509; otherwise, proceeding to step 510;

Step S509, waiting for local maintenance terminal to release the authorization locking, after the ODN device is in idle state, proceeding to the step S507;

Step S510, maintaining the current configuration data;

Step S511, delivering the operation instruction, and carrying out the processing flow of mutual exclusion protection on the same configuration operation;

Step S512, determining the result of the processing flow of carrying out mutual exclusion protection on the same configuration operation; if the operation is time-out and the operation authorization is preempted by local maintenance center, releasing the control right, recovering the configuration to the operation prior to obtaining the control right and ending this flow; otherwise, if the operation authorization is not preempted, proceeding to the step S513;

Step S513, executing the operation instruction according to normal sequence, and this flow is completed.

In the said method, the processing flow of local maintenance center delivering operation instruction is as follows:

Step S601, receiving the operation instruction;

Step S602, determining the source of operation instruction; if the operation instruction is from the remote maintenance center, proceeding to the step S603; otherwise, proceeding to the processing flow of the remote maintenance center or the local operation maintenance terminal;

Step S603: determining whether the ODN device is under control of local maintenance center; if yes, proceeding to the Step S608; if not, proceeding to step S604;

Step S604: determining whether the ODN device is in the authorization locked state of remote maintenance center or local maintenance terminal; if yes, proceeding to the Step S605; otherwise, proceeding to step S608;

Step S605: waiting for that the configuration authorization is released and ODN device is in idle state;

Step S606, determining whether the waiting is time-out, if yes, proceeding to Step S607; otherwise, proceeding to step S605;

Step S607; after preempting the control right and obtaining the operation authorization, recovering the configuration to the configuration before the remote maintenance center or the local maintenance terminal has obtained the operation authorization; after recovery of configuration, proceeding to the step S608;

Step S608, delivering the operation instruction, and carrying out the processing flow of mutual exclusion protection on the same configuration operation; this flow is completed.

According to the present invention, system exception caused by conflicted operations is effectively prevented by mutual exclusion of operations of multiple maintenance and management terminals, so that the reliability and serviceability of the intelligent ODN management system are effectively improved.

DETAILED DESCRIPTION OF THE PREFERRED EMBODIMENTS

Figure 1:
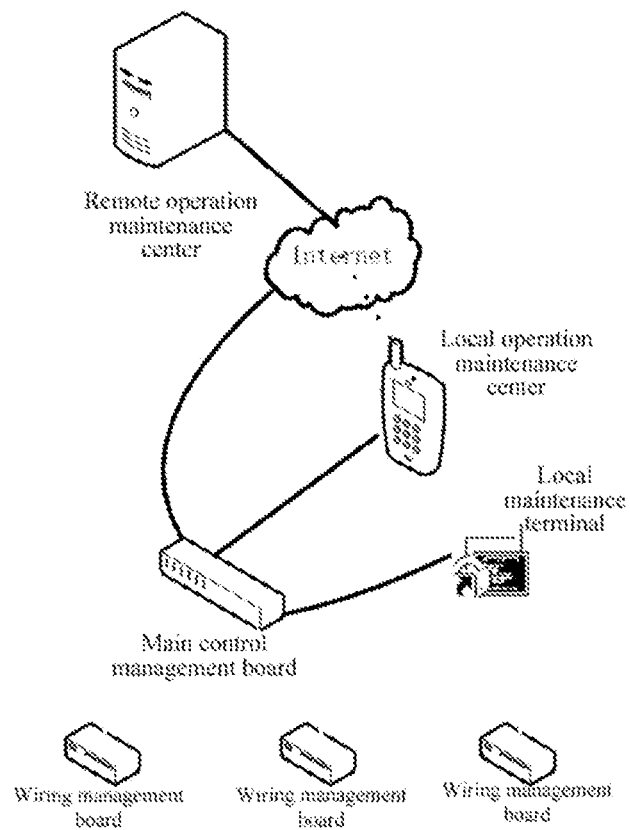
FIG. 1 is the composition structure diagram of the intelligent management system.

As shown in FIG. 1, the intelligent ODN management system is composed of a main control management unit and a sub-frame wiring control panel. At most one main control management unit is configured. The main control management unit is communicated with remote maintenance center through network interface and can be connected with local maintenance center operated in the field through USB interface or operated by local maintenance terminal. The sub-frame wiring control panel is used to carry out control on the wiring interface board. The main control management unit is used to manage multiple sub-frames through RJ45 interface, and each sub-frame can manage multiple wiring interface boards through the sub-frame wiring control panel.

A maintenance method of intelligent ODN management system provided by the present invention, comprising the following steps:

(1) Carrying out mutual exclusion protection on the same operation task.

Carrying out protection on each executable operation task by means of operation authorization, wherein each executable operation task is protected by operation authorization, and any one maintenance and management terminal needs to acquire the operation authorization of the operation task before executing the operation task and release the corresponding operation authorization after the execution is finished; the maintenance and management terminal comprises a local maintenance center, a remote maintenance center and a local maintenance terminal;

2) Carrying out mutual exclusion protection on different maintenance management terminal.

Because the local maintenance center enjoys higher priority, after starting of ODN device, it is necessary to firstly detect whether ODN device has been connected with local maintenance center; if yes, the local maintenance center obtains the control right on system. In such state, the remote maintenance center and the local maintenance terminal need to apply for authorization from the local maintenance center before operating the system, and can only deliver an operation instruction after successfully applying for authorization. After the remote maintenance center and the local maintenance terminal have obtained the operation authorization, the local maintenance terminal can also carry out operation on ODN device. If the remote maintenance center and the local maintenance terminal need to exclusively enjoy the control right on the intelligent ODN management systems and do not allow the other maintenance management terminals to operate the system, they can carry out the operation of locking the configuration right; after the configuration right has been locked, the other maintenance management terminals cannot carry out any operation on ODN device and can only deliver operation instruction until the configuration right is unlocked. If the time used by the remote maintenance center and the local maintenance terminal for locking the configuration authorization is too long and exceeds the preset maximum waiting time, carrying out automatic unlocking.

The local maintenance center can preempt the operation right and restore the configuration data to the configuration before the remote maintenance center and the local maintenance terminal have obtained the configuration authorization.

The present invention is described in detail with reference to the attached drawings of specification.

Figure 2:
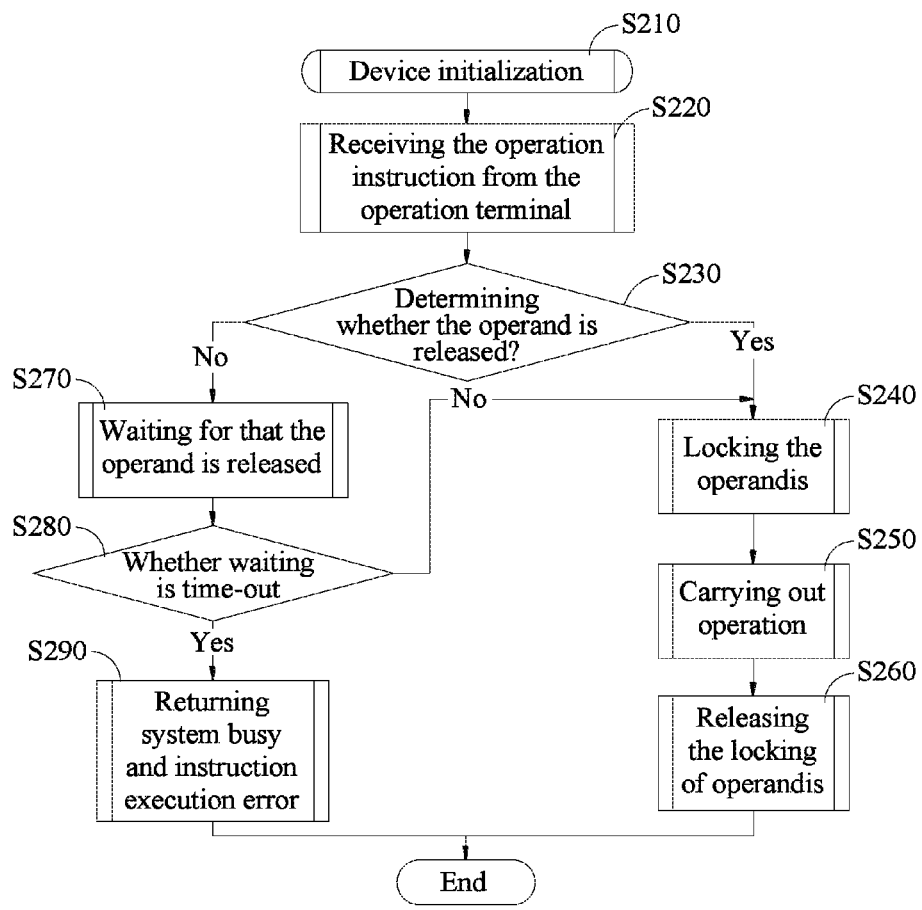
FIG. 2 illustrates the processing flow of carrying out mutual exclusion protection on the same configuration operation in the present invention.

As shown in FIG. 2, the processing flow of carrying out mutual exclusion protection on the same operation task is as follows:

Step S210: ODN device initialization, completing power-on and polling self-inspection;

Step S220: receiving the operation instructions from the local maintenance center, the remote maintenance center or local maintenance terminal;

Step S230: determining whether the target operand of operation instruction is in release state, if yes, proceeding to Step S240; if no, the operand is not in the release state, proceeding to step S270;

Step S240, locking the operand and obtaining the operation authorization on the operand, so that the other maintenance management terminals may not perform operation on this operand;

Step S250: executing the operation instruction on ODN device;

Step S260, after completion of operation, releasing the locking of operand, so that the other maintenance management terminal can obtain the operation authorization of this operand, ending;

Step S270, waiting for the operand being released;

Step S280, determining whether the time of waiting for obtaining authority is time-out, if yes, proceeding to Step S290; otherwise, proceeding to step S240;

Step 290: returning the alarm of system busy and operation instruction execution error, ending this flow, and waiting for the next operating instruction when the system has recovered idle state.

Figure 3:
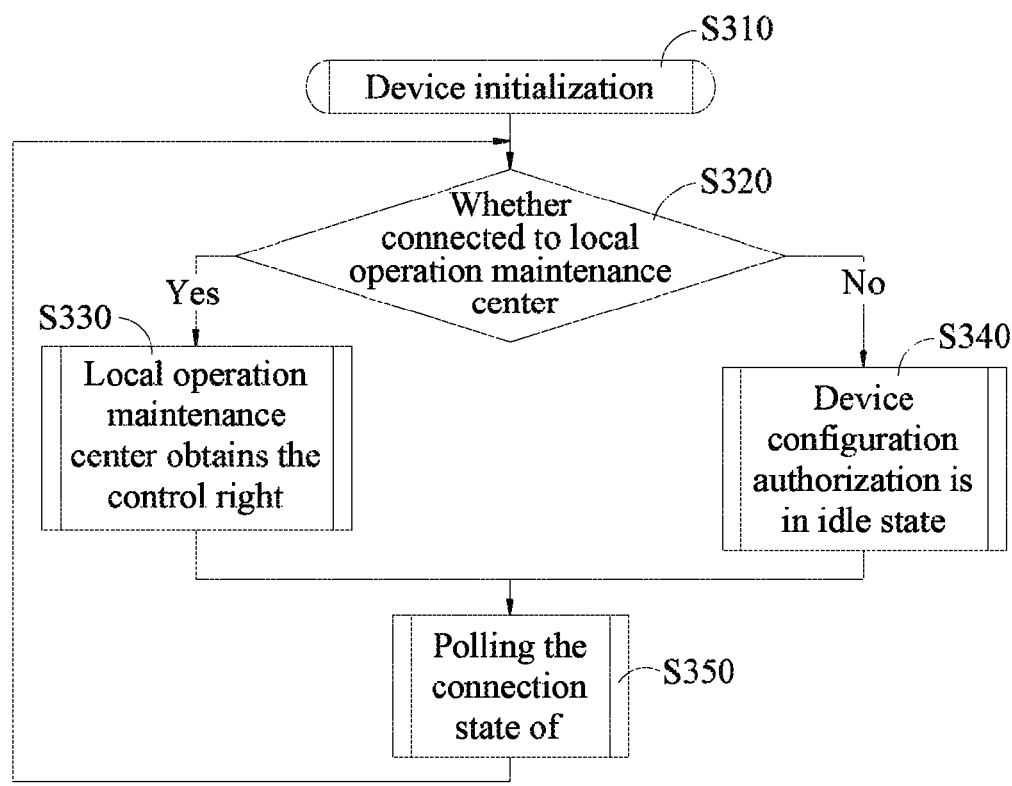
FIG. 3 illustrates the processing flow of the system default operation authorization in the present invention.

As shown in FIG. 3, the processing flow of system default operation authorization is as follows:

Step S310, ODN device initialization;

Step S320: carrying out polling detection on whether the ODN device has been connected to the local maintenance center; if yes, proceeding to the Step S330; otherwise, proceeding to step S340;

Step S330: the local maintenance center obtaining the control right, proceeding to step S350;

Step S340, describing that the device configuration right is in idle state, and proceeding to step S350;

Step S350: continuing polling connection state, if the disconnection of local maintenance center is detected, releasing the control right of local maintenance center, proceeding to the step 320.

Figure 4:
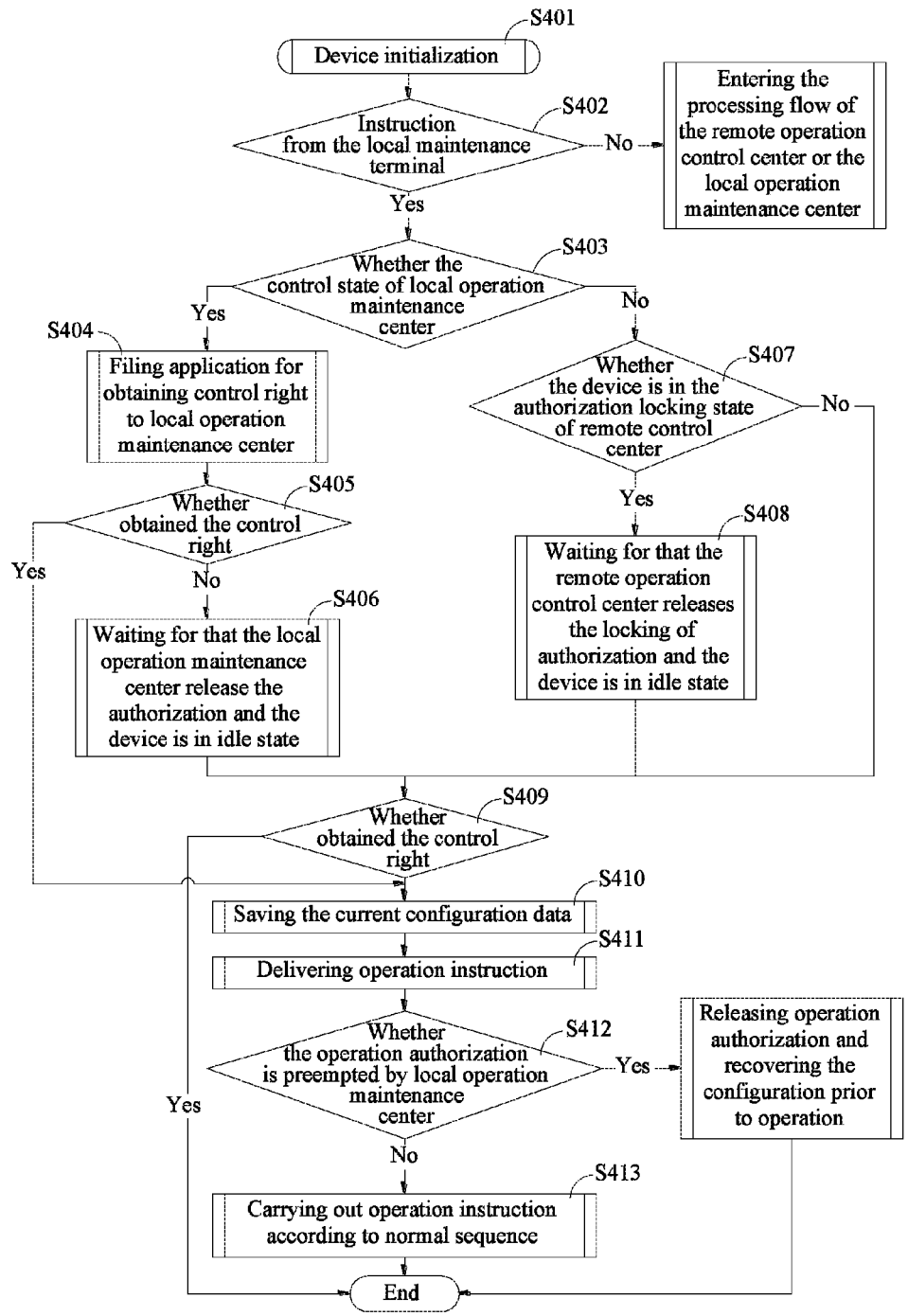
FIG. 4 illustrates the processing flow of local operation maintenance terminal delivering operating instruction in the present invention.

As shown in FIG. 4, the processing flow of local operation maintenance terminal delivering operation instruction is as follows:

Step S401, receiving the operation instruction;

Step S402, determining the source of operation instruction; if the operation instruction is issued from the local maintenance terminal, proceeding to the step S403; if not, proceeding to the processing flow of the remote operation center or local maintenance center;

Step S403: determining whether the ODN device is under control of local maintenance center; if yes, proceeding to the Step S404; otherwise, proceeding to step S407;

Step S404: filing application for obtaining the control right to the local maintenance center;

Step S405: determining whether the local operation maintenance terminal has obtained the control right, if yes, proceeding to the step S410; otherwise, proceeding to the step S406;

Step S406: waiting for local maintenance center to release the control right, proceeding to step S409;

Step S407: determining whether ODN device is in the authority locking state of remote maintenance center; if yes, proceeding to the step S408, otherwise, proceeding to the step S409;

Step S408: waiting for the remote maintenance center to release the locking authority, so that the OND device is in idle state;

Step S409: determining whether waiting is time out; if yes, returning unsuccessfull execution of operation instruction and ending this flow; otherwise, proceeding to step S410;

Step S410, saving the current configuration data;

Step S411, delivering the operation instruction, and carrying out the processing flow of mutual exclusion protection on the same configuration operation;

Step S412, determining the result of the processing flow of carrying out mutual exclusion protection on the same configuration operation; if the operation is time-out and the operation authorization is preempted by local maintenance center, releasing the operation authorization, recovering the previous configuration and ending this flow; otherwise, proceeding to the step S413;

Step 413, executing the operation instruction according to normal sequence, and this flow is completed.

Figure 5:
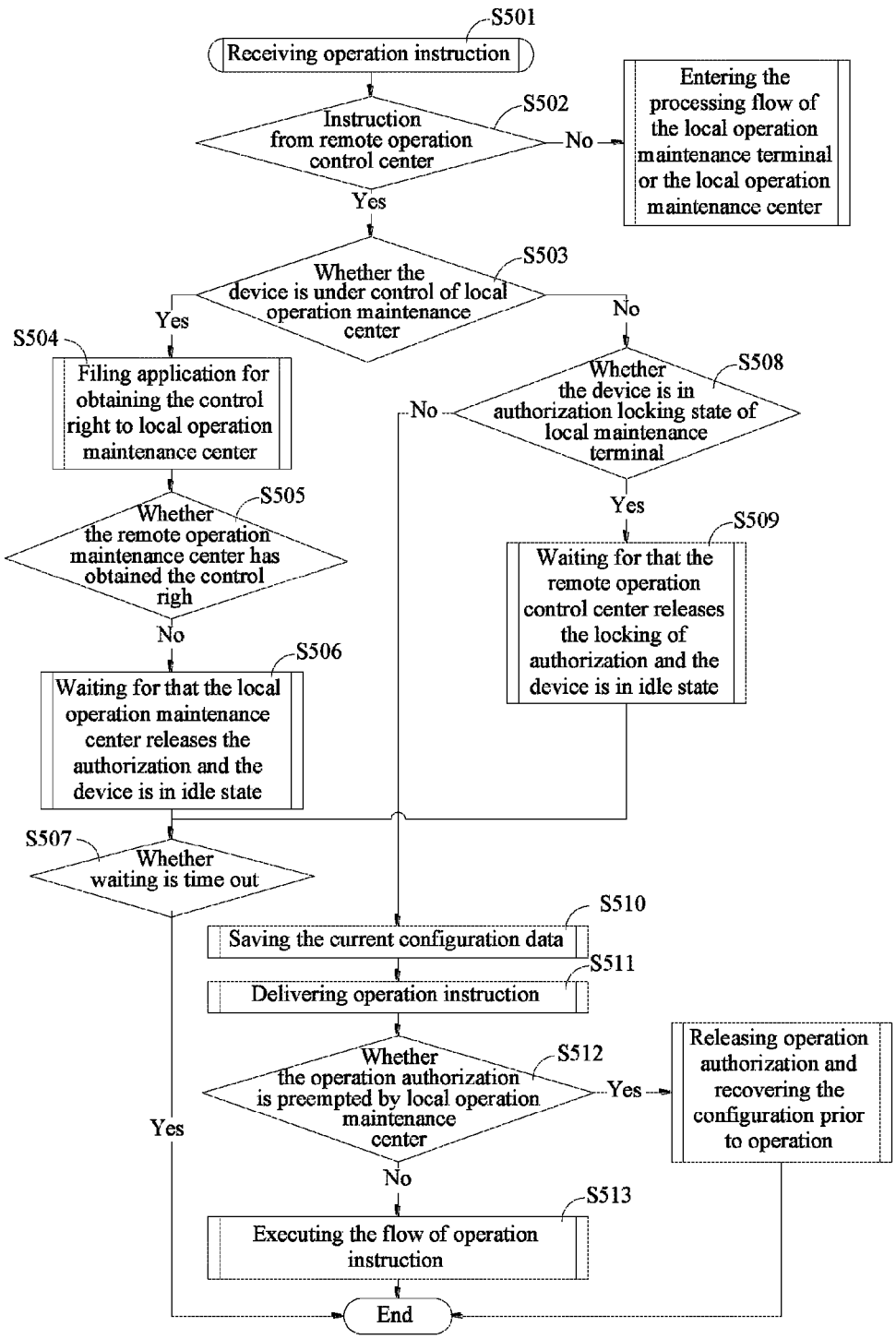
FIG. 5 illustrates the processing flow of the remote maintenance center delivering operating instruction in the present invention.

As shown in FIG. 5, the processing flow of remote maintenance center delivering operation instruction is as follows:

Step S501, receiving the operation instruction;

Step S502, determining the source of operation instruction; if the operation instruction is from the remote maintenance center, proceeding to step S503; otherwise, proceeding to the processing flow of local maintenance center or local operation maintenance terminal;

Step S503: determining whether the ODN device is under control of local maintenance center; if yes, proceeding to the Step S504; if not, proceeding to step S508;

Step S504: filing application for obtaining the control right to the local maintenance center;

Step S505: determining whether the remote maintenance center has obtained the control right; if yes, proceeding to the step S510; otherwise, proceeding to the step S506;

Step S506: waiting for the local maintenance center to release the control right, and ODN device is in idle state;

Step S507, whether waiting is time out; if yes, ending this flow; otherwise, proceeding to step S510;

Step S508: determining whether the ODN device is in the authorization locked state of local maintenance terminal; if yes, proceeding to the Step 509; otherwise, proceeding to step 510;

Step S509, waiting for local maintenance terminal to release the authorization locking, after the ODN device is in idle state, proceeding to the step S507;

Step S510, maintaining the current configuration data;

Step S511, delivering the operation instruction, and carrying out the processing flow of mutual exclusion protection on the same configuration operation;

Step S512, determining the result of the processing flow of carrying out mutual exclusion protection on the same configuration operation; if the operation is time-out and the operation authorization is preempted by local maintenance center, releasing the control right, recovering the configuration to the operation prior to obtaining the control right and ending this flow; otherwise, if the operation authorization is not preempted, proceeding to the step S513;

Step S513, executing the operation instruction according to normal sequence, and this flow is completed.

Figure 6:
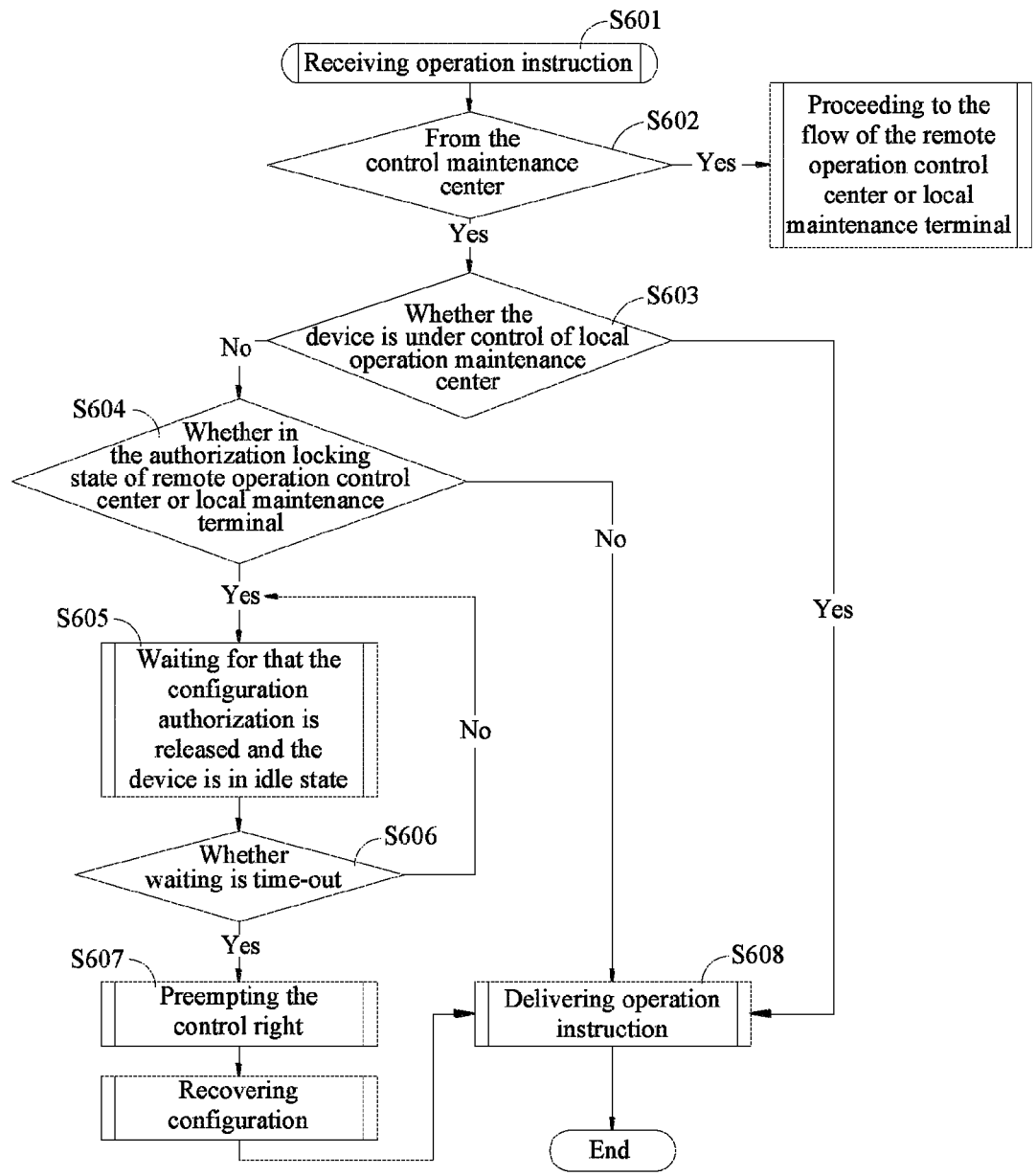
FIG. 6 illustrates the processing flow of the local maintenance center delivering operation instruction in the present invention.

As shown in FIG. 6, the processing flow of local maintenance center delivering operating instruction is as follows:

Step S601, receiving the operation instruction;

Step S602, determining the source of operation instruction; if the operation instruction is from the local maintenance center, proceeding to the step S603; otherwise, proceeding to the processing flow of the remote maintenance center or the local maintenance terminal;

Step S603: determining whether the ODN device is under control of local maintenance center; if yes, proceeding to the Step S608; if not, proceeding to step S604;

Step S604: determining whether the ODN device is in the authorization locked state of remote maintenance center or local maintenance terminal; if yes, proceeding to the Step S605; otherwise, proceeding to step S608;

Step S605: waiting for that the configuration authorization is released and ODN device is in idle state;

Step S606, determining whether the waiting is time-out, if yes, proceeding to Step S607; otherwise, proceeding to step S605;

Step S607; after preempting the control right and obtaining the operation authorization, recovering the configuration to the configuration before the remote maintenance center or the local maintenance terminal has obtained the operation authorization; after recovery of configuration, proceeding to the step S608;

Step S608, delivering the operation instruction, and carrying out the processing flow of mutual exclusion protection on the same configuration operation; this flow is completed.

The Present Invention has the Following Beneficial Effects:

According to the present invention, the multi-terminal operation maintenance is improved through mutual exclusion of operation and system exception caused by conflicted operations is effectively prevented, so that the reliability and serviceability of the intelligent ODN management system are effectively improved. Namely, the present invention can prevent the influence on system stability when different operating systems are concurrently executing a same operation and also prevent the error change of configuration when different operating systems concurrently executing different operations, thus greatly reducing the configuration error and system fault caused by conflicted operations. Furthermore, this processing method has no special requirement for local maintenance terminal, local maintenance, center and remote maintenance center, and is compatible with any operation maintenance system which conforms to internet device protocol.

The present invention is not limited to the said preferred embodiments. It should be known by anybody that, any structure change made under the inspiration of the present invention which has the same or similar technical solution as the present invention shall fall within the claims of the present invention.

What is claimed is:

1. A maintenance method of intelligent ODN management system, comprising the following steps:
    performing, by a computing device;
    carrying out mutual exclusion protection on a same operation task, wherein each executable operation task is protected by operation authorization, and any one maintenance and management terminal needs to acquire the operation authorization of the operation task before executing the operation task and release the corresponding operation authorization after the execution is finished; the maintenance and management terminal comprises a local maintenance center, a remote maintenance center and a local maintenance terminal; and
    carrying out mutual exclusion protection on different maintenance and management terminals, wherein after a local maintenance center obtains control right on the intelligent ODN management system, a remote maintenance center and a local maintenance terminal need to apply for authorization from the local maintenance center before operating the intelligent ODN management system, and can deliver an operation instruction after successfully applying for the authorization.

2. The maintenance method of intelligent ODN management system of claim 1, wherein if the remote maintenance center and the local maintenance terminal need to exclusively enjoy the control right on the intelligent ODN management systems, carrying out the operation of locking the configuration right; after the operation of locking configuration right is finished, the other maintenance managements cannot carry out any operation on ODN device, and can only deliver an operation instruction after the remote maintenance center and local maintenance terminal have unlocked the control right on the intelligent ODN management system.

3. The maintenance method of intelligent ODN management system of claim 1, wherein if the time used by the remote maintenance center and the local maintenance terminal for locking the control right on the intelligent ODN management systems exceeds the preset time limit, carrying out automatic unlocking.

4. The maintenance method of intelligent ODN management system of claim 1, wherein the local maintenance center preempting the control right on the intelligent ODN management systems in the preemption mode, and restoring the configuration data to the remote maintenance center and the local maintenance terminal to obtain the configuration prior to the control right on the intelligent ODN management system.

5. The maintenance method of intelligent ODN management system of claim 1, wherein the processing flow of carrying out mutual exclusion protection on a same operation task is as follows:

Step S210: ODN device initialization, completing power-on and polling self-inspection;
Step S220: receiving the operation instructions from the local maintenance center, the remote maintenance center or local maintenance terminal;
Step S230: determining whether the target operand of operation instruction is in release state, if yes, proceeding to Step S240; if no, proceeding to step S270;
Step S240: locking the operand;
Step S250: executing the operation instruction;
Step S260: after completion of operation, releasing the lock of operand, and end;
Step S270, waiting for that the operand is released;
Step S280, determining whether the time of waiting for obtaining authority is time-out, if yes, proceeding to Step S290; otherwise, proceeding to step S240;
Step S290: returning the alarm of system busy and operation instruction execution error, end.

6. The maintenance method of intelligent ODN management system of claim 1, wherein the processing flow of local maintenance terminal issuing operation instruction is as follows:

Step S401, receiving the operation instruction;
Step S402, determining the source of operation instruction; if the operation instruction is delivered from the local maintenance terminal, proceeding to the step S403; if not, proceeding to the processing flow of the remote operation center or local maintenance center;
Step S403: determining whether the ODN device is under control of local maintenance center; if yes, proceeding to the Step S404; otherwise, proceeding to step S407;
Step S404: filing application for obtaining the control right to the local maintenance center;
Step S405: determining whether the local operation maintenance terminal has obtained the control right, if yes, proceeding to the step S410; otherwise, proceeding to the step S406;
Step S406: waiting for local maintenance center to release the control right, proceeding to step S409;
Step S407: determining whether ODN device is in the authority locking state of remote maintenance center; if yes, proceeding to the step S408, otherwise, proceeding to the step S409;
Step S408: waiting for the remote maintenance center to release the locking authority, so that the OND device is in idle state;
Step S409: determining whether waiting is time out; if yes, returning unsuccessful execution of operation instruction and ending this flow; otherwise, proceeding to step S410;
Step S410, saving the current configuration data;
Step S411, delivering the operation instruction, and carrying out the processing flow of mutual exclusion protection on the same configuration operation;
Step S412, determining the result of the processing flow of carrying out mutual exclusion protection on the same configuration operation; if the operation is time-out and the operation authorization is preempted by local maintenance center, releasing the operation authorization, recovering the previous configuration and ending this flow; otherwise, proceeding to the step S413;
Step 413, executing the operation instruction according to normal sequence, and this flow is completed.

7. The maintenance method of intelligent ODN management system of claim 1, wherein the processing flow of remote maintenance center delivering operation instruction is as follows:

Step S501, receiving the operation instruction;

Step S502, determining the source of operation instruction; if the operation instruction is from the remote maintenance center, proceeding to step S503; otherwise, proceeding to the processing flow of local maintenance center or local operation maintenance terminal;

Step S503: determining whether the ODN device is under control of local maintenance center; if yes, proceeding to the Step S504; if not, proceeding to step S508;

Step S504: filing application for obtaining the control right to the local maintenance center;

Step S505: determining whether the remote maintenance center has obtained the control right; if yes, proceeding to the step S510; otherwise, proceeding to the step S506;

Step S506: waiting for the local maintenance center to release the control right, and ODN device is in idle state;

Step S507, whether waiting is time out; if yes, ending this flow; otherwise, proceeding to step S510;

Step S508: determining whether the ODN device is in the authorization locked state of local maintenance terminal; if yes, proceeding to the Step 509; otherwise, proceeding to step 510;

Step S509, waiting for local maintenance terminal to release the authorization locking, after the ODN device is in idle state, proceeding to the step S507;

Step S510, maintaining the current configuration data;

Step S511, delivering the operation instruction, and carrying out the processing flow of mutual exclusion protection on the same configuration operation;

Step S512, determining the result of the processing flow of carrying out mutual exclusion protection on the same configuration operation; if the operation is time-out and the operation authorization is preempted by local maintenance center, releasing the control right, recovering the configuration to the operation prior to obtaining the control right and ending this flow; otherwise, if the operation authorization is not preempted, proceeding to the step S513;

Step S513, executing the operation instruction according to normal sequence, and this flow is completed.

8. The maintenance method of intelligent ODN management system of claim 1, wherein the processing flow of local maintenance center delivering operation instruction is as follows:

Step S601, receiving the operation instruction;

Step S602, determining the source of operation instruction; if the operation instruction is from the local maintenance center, proceeding to the step S603; otherwise, proceeding to the processing flow of the remote maintenance center or the local operation maintenance terminal;

Step S603: determining whether the ODN device is under control of local maintenance center; if yes, proceeding to the Step S608; if not, proceeding to step S604;

Step S604: determining whether the ODN device is in the authorization locked state of remote maintenance center or local maintenance terminal; if yes, proceeding to the Step S605; otherwise, proceeding to step S608;

Step S605: waiting for that the configuration authorization is released and ODN device is in idle state;

Step S606, determining whether the waiting is time-out, if yes, proceeding to Step S607; otherwise, proceeding to step S605;

Step S607; after preempting the control right and obtaining the operation authorization, recovering the configuration to the configuration before the remote maintenance center or the local maintenance terminal has obtained the operation authorization; after recovery of configuration, proceeding to the step S608;

Step S608, delivering the operation instruction, and carrying out the processing flow of mutual exclusion protection on the same configuration operation; this flow is completed.

* * * * *